(12) United States Patent
Karlow et al.

(10) Patent No.: US 7,431,336 B2
(45) Date of Patent: Oct. 7, 2008

(54) AIRBAG MODULE WITH INFLATION CONTROL

(75) Inventors: James P. Karlow, Commerce Township, MI (US); Barney J. Bauer, Rochester, MI (US)

(73) Assignee: TK Holdings Inc., Auburn Hills, MI (US)

( * ) Notice: Subject to any disclaimer, the term of this patent is extended or adjusted under 35 U.S.C. 154(b) by 213 days.

(21) Appl. No.: 11/250,423

(22) Filed: Oct. 17, 2005

(65) Prior Publication Data

US 2007/0085312 A1    Apr. 19, 2007

(51) Int. Cl.
*B60R 21/276* (2006.01)
(52) U.S. Cl. .................................. 280/739; 280/742
(58) Field of Classification Search ............. 280/728.2, 280/736, 739, 740, 741, 742, 738
See application file for complete search history.

(56) References Cited

U.S. PATENT DOCUMENTS

| | | | | |
|---|---|---|---|---|
| 1,974,015 | A * | 9/1934 | Decker et al. | 102/335 |
| 5,695,214 | A | 12/1997 | Faigle et al. | |
| 5,853,192 | A * | 12/1998 | Sikorski et al. | 280/739 |
| 5,942,717 | A * | 8/1999 | Pathe et al. | 102/202.2 |
| 6,039,346 | A | 3/2000 | Ryan et al. | |
| 6,117,254 | A * | 9/2000 | Rink et al. | 149/35 |
| 6,406,055 | B1 | 6/2002 | Raigle et al. | |
| 6,435,549 | B1 | 8/2002 | Ochiai | |
| 6,439,603 | B2 * | 8/2002 | Damman et al. | 280/736 |
| 6,547,274 | B2 | 4/2003 | Ochiai | |
| 6,692,021 | B2 | 2/2004 | Amamori | |
| 6,746,044 | B2 * | 6/2004 | Elqadah et al. | 280/736 |
| 6,749,222 | B2 * | 6/2004 | Manwaring et al. | 280/777 |
| 6,814,372 | B1 | 11/2004 | Kang et al. | |
| 6,830,265 | B2 * | 12/2004 | Ford | 280/739 |
| 6,893,041 | B2 | 5/2005 | Elqadah et al. | |
| 2002/0145274 | A1* | 10/2002 | Magoteaux | 280/740 |
| 2003/0025309 | A1* | 2/2003 | Schenck et al. | 280/735 |
| 2003/0075405 | A1* | 4/2003 | Manwaring et al. | 188/371 |
| 2003/0107207 | A1 | 6/2003 | Elqadah et al. | |
| 2003/0193177 | A1 | 10/2003 | Elqadah et al. | |
| 2003/0214124 | A1* | 11/2003 | DePottey et al. | 280/739 |
| 2004/0051286 | A1 | 3/2004 | Fischer et al. | |
| 2004/0113406 | A1 | 6/2004 | Elqadah et al. | |
| 2004/0155442 | A1 | 8/2004 | Ford et al. | |
| 2004/0155443 | A1 | 8/2004 | Ford | |
| 2006/0055159 | A1* | 3/2006 | Fischer et al. | 280/739 |
| 2006/0071463 | A1* | 4/2006 | Deckenhoff et al. | 280/739 |

* cited by examiner

*Primary Examiner*—Christopher Ellis
*Assistant Examiner*—Joseph Rocca
(74) *Attorney, Agent, or Firm*—Foley & Lardner LLP

(57) ABSTRACT

An airbag module includes a housing having at least one aperture for releasing gas from an interior of the housing during inflation of an airbag. The airbag module also includes a member configured for movement between a first position in which the member impedes the flow of gas through the at least one aperture and a second position in which the member does not impede the flow of gas through the at least one aperture. A pyrotechnic device is attached to the member for directing a burst of gas toward a fixed surface to cause the member and the pyrotechnic device to move between the first position and the second position.

10 Claims, 6 Drawing Sheets

AIRBAG MODULE WITH INFLATION CONTROL

BACKGROUND

The present invention relates generally to the field of airbags and airbag assemblies for vehicles, and, more specifically, to systems for controlling the amount or degree of airbag inflation.

Inflatable airbags have become standard equipment in modern automobiles. Such airbags typically include a bag portion that inflates when a predetermined condition is met (e.g., a vehicle impact). An inflator is utilized to provide the gas for inflating the bag portion. Airbag assemblies utilizing inflatable airbags may be positioned at various locations in a passenger compartment of an automobile (e.g., in a steering wheel, dashboard, etc.).

In certain circumstances, it may be desirable to control the degree of airbag inflation that occurs when the predetermined condition is met. For example, if a vehicle occupant is seated within a relatively close proximity to the airbag or in the case of a relatively low speed collision, it may be desirable to inflate the airbag to a lesser degree. Similar modifications to the degree of inflation may be desired based on the weight or size of the occupant, among other factors.

In certain known airbag assemblies, a door or flap covers a hole for routing gas from within an airbag assembly. The door is held shut by pyrotechnic fasteners such as bolts that are configured to sever in a pyrotechnic event to allow the door to move away from the hole, thus allowing gas to escape through the hole. However, such fasteners are relatively expensive and break apart during actuation, which may result in an undesirable ejection of pieces of the fastener.

It would be desirable to provide an improved airbag assembly that includes a device that may alter or modify the degree of airbag inflation. It would also be desirable to provide an improved airbag assembly that utilizes a relatively simple and inexpensive device for directing a portion of the gas out of an airbag housing that does not result in separation or detachment of components of the airbag assembly. It would be desirable to provide an airbag assembly that includes any one or more of these or other advantageous features as may be apparent to those reviewing this disclosure.

SUMMARY

An exemplary embodiment of the invention relates to an airbag module that includes a housing having at least one aperture for releasing gas from an interior of the housing during inflation of an airbag. The airbag module also includes a member configured for movement between a first position in which the member impedes the flow of gas through the at least one aperture and a second position in which the member does not impede the flow of gas through the at least one aperture. A pyrotechnic device is attached to the member for directing a burst of gas toward a fixed surface to cause the member and the pyrotechnic device to move between the first position and the second position.

Another exemplary embodiment of the invention relates to an airbag assembly that includes a container for an airbag, an inflator for providing a gas within the container to inflate the airbag, and at least one opening extending through a wall of the container to allow the gas to escape from the container. A member is provided within the housing that is configured for movement between a first position in which the at least one opening is substantially blocked by the member and a second position in which the at least one opening is not blocked by the member. A pyrotechnic device is provided within the housing that when actuated causes the member to move from the second position to the first position.

Another exemplary embodiment of the invention relates to a system for releasing gas from within an airbag housing that includes a member coupled to an airbag housing and a pyrotechnic device coupled to the member. The pyrotechnic device is configured to expel a gas to move at least a portion of the member. The member is provided adjacent a hole formed in the housing and is configured such that actuation of the pyrotechnic device causes the pyrotechnic device and at least a portion of the member to move away from the hole to allow gas to escape the housing through the hole. It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims and the accompanying exemplary embodiments shown in the drawings, which are briefly described below.

DETAILED DESCRIPTION OF EXEMPLARY EMBODIMENTS

According to an exemplary embodiment, an airbag module or assembly includes a device or mechanism for controlling the degree or amount of inflation of an airbag. The device is intended to provide the ability to alter or modify the amount of gas used to inflate an airbag when a predetermined event (e.g., a vehicle crash) occurs. The device or mechanism utilizes a pyrotechnic device that does not break apart upon actuation.

Figure 1:
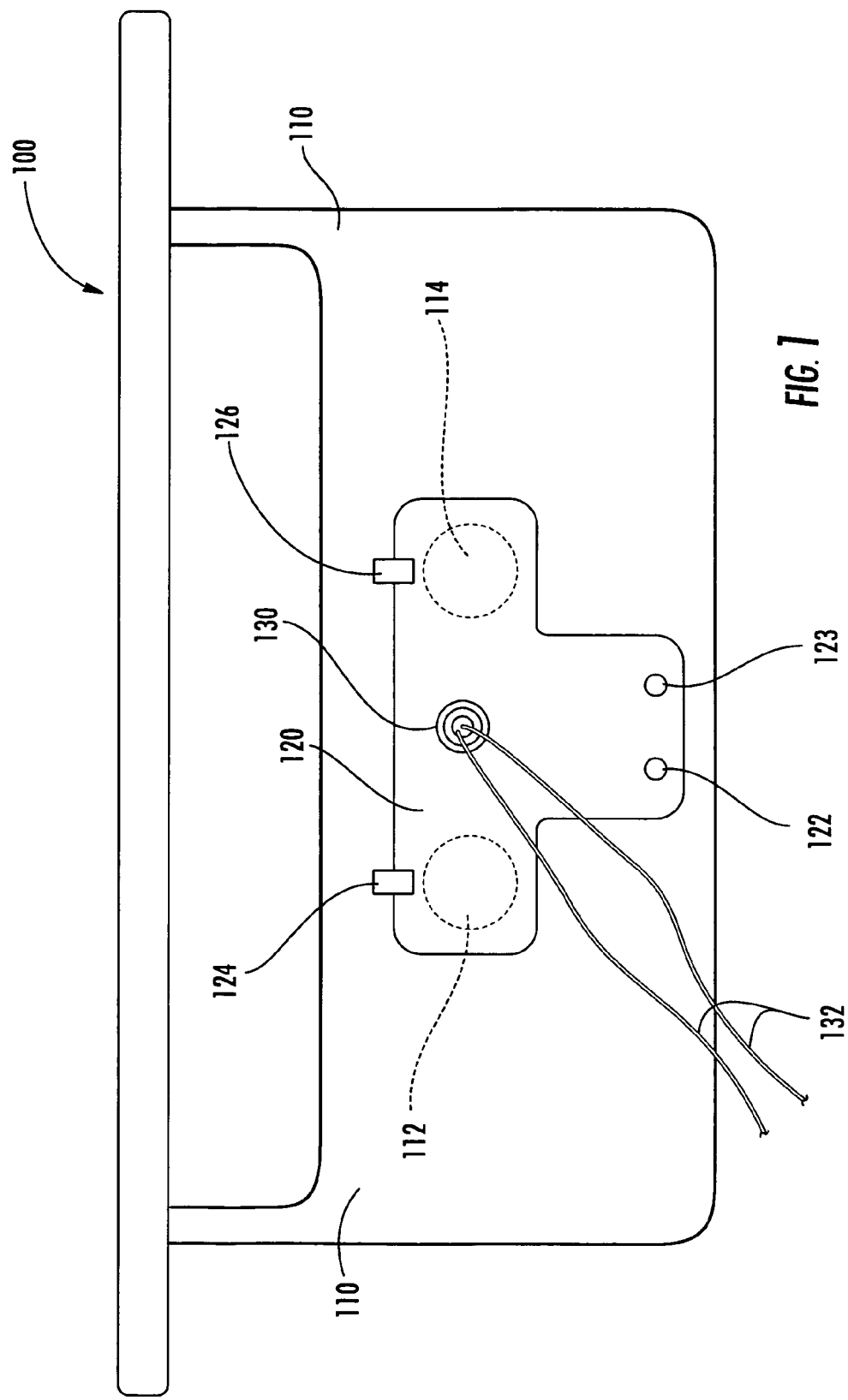
FIG. 1 is a plan view of an airbag assembly according to an exemplary embodiment.

FIG. 1 illustrates a plan view of a portion of an airbag module or assembly 100 according to an exemplary embodiment. The airbag module 100 includes a housing or container 110 having apertures or holes 112 and 114 formed therein. While FIG. 1 illustrates a configuration in which two circular apertures are provided in the housing 110, according to various other exemplary embodiments, a different number of apertures having any of a variety of sizes or shapes may be utilized.

As shown in FIG. 1, a member or element 120 in the form of a ductile or bendable plate is provided in contact with an external surface of the housing 110. According to an exemplary embodiment, the member 120 is made of a metal such as aluminum, steel, copper, and alloys thereof. According to other exemplary embodiments, the member may be formed of other suitable ductile materials.

The member 120 is secured or attached to the housing 110 at a first end by one or more fasteners 122 and 123, which may be provided as bolts, screws, rivets, TOX type upset joints, or any other suitable fastener. Such fasteners are intended to securely retain the first end of the member 120 in contact with the housing 110 when the member 120 is moved to expose the apertures 112 and 114.

Optionally, one or more fasteners in the form of a clip, screw, adhesive, hook-and-loop fastener (e.g., Velcro™), or any other suitable fastener may be provided at a second end of the member 120 (e.g., opposite the first end) to secure the second end in place adjacent the housing 110. These optional fasteners are intended to retain the second end of the member 120 in place only until the member is moved to uncover the apertures 112 and 114.

Figure 2B:
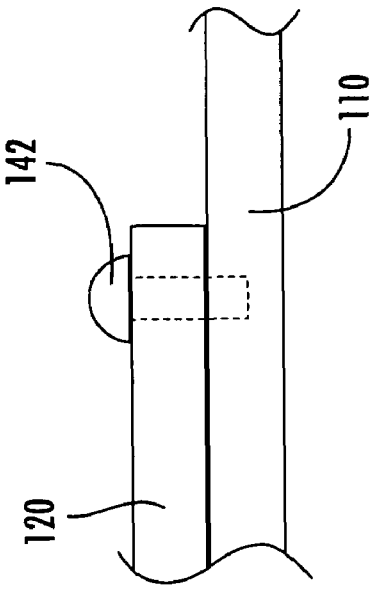
FIG. 2B is a cross-sectional view of portion of an airbag assembly similar to that shown in FIG. 1 illustrating a device for controlling the degree of inflation of an airbag according to another exemplary embodiment.
Figure 2C:
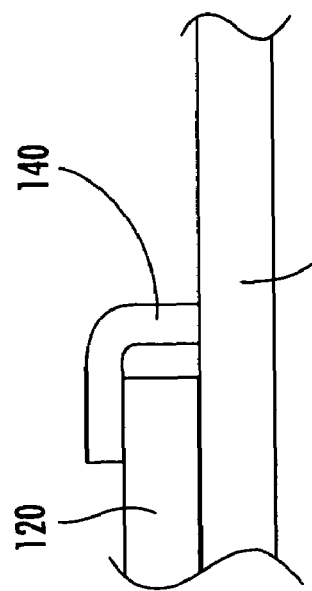
FIG. 2C is a cross-sectional view of portion of an airbag assembly similar to that shown in FIG. 1 illustrating a device controlling the degree of inflation of an airbag according to another exemplary embodiment.
Figure 2A:
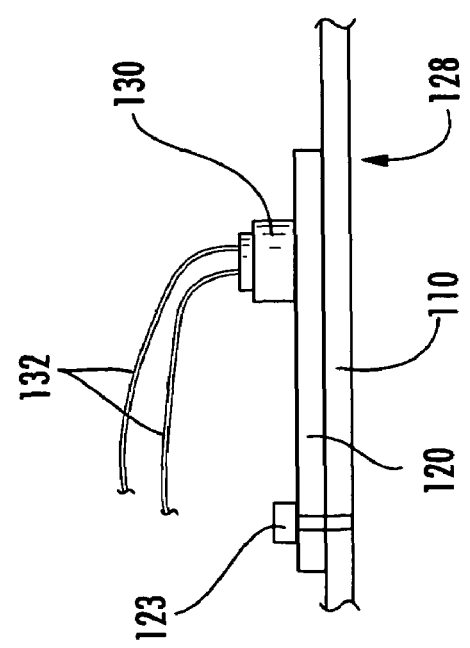
FIG. 2A is a cross-sectional view of portion of an airbag assembly similar to that shown in FIG. 1 illustrating a device for controlling the degree of inflation of an airbag according to an exemplary embodiment.

As shown in FIG. 2A, no fastener is provided at the second end of the member 120 to retain the second end adjacent the housing 110. That is, the second end of the member is held in position by the fasteners used to secure the first end to the housing 110. According to another exemplary embodiment, an adhesive or the like may be utilized to retain the second end in place.

According to an exemplary embodiment illustrated in FIG. 2B, a fastener 140 in the form of a ductile or bendable strip is provided to retain the second end of the member 120 in contact with the housing 110 (similar elements are also shown in FIG. 1). In the event that the second end of the member 120 is moved away from the housing 110, the ductile strip will bend to allow movement of the member 120. According to an exemplary embodiment, the fastener is made from a relatively ductile material such as aluminum or a mild steel.

According to another exemplary embodiment illustrated in FIG. 2C, a fastener 142 in the form of a screw or bolt is provided to secure the second end of the member 120 in contact with the housing 110. The fastener 142 is configured such that the member 120 may move away from the housing 110 when the member 120 is forced away from the housing 110. For example, the fastener 142 may be provided such that it extends only a short distance into the housing 110 such that it disconnects from the housing relatively easily when the member 120 is moved away from the housing 110.

As shown in FIG. 1, an electrically actuated pyrotechnic device 130 is attached or coupled to the member 120 according to an exemplary embodiment. As shown in FIG. 1, the pyrotechnic device 130 is provided intermediate or between the apertures 112 and 114 such that it is relatively centered with respect to such openings. According to various other exemplary embodiments, the pyrotechnic device may be provided at other locations on the member which may be suitable to allow the pyrotechnic device to perform its desired function.

Figure 3A:
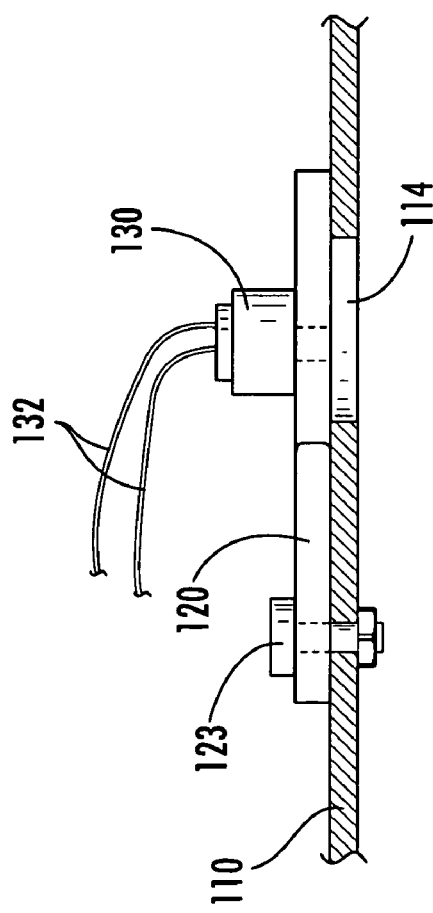
FIG. 3A is a cross-sectional view of a portion of an airbag assembly similar to that shown in FIG. 1 illustrating a device for controlling the degree of inflation of an airbag positioned such that an aperture in the housing is substantially blocked.
Figure 3B:
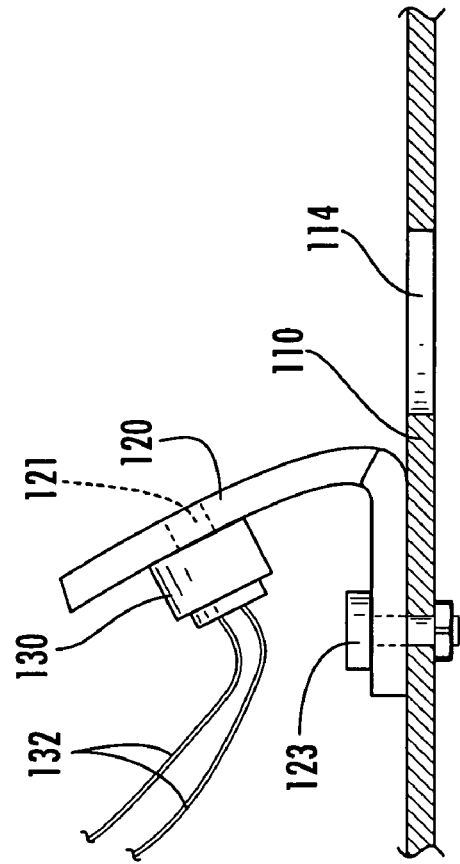
FIG. 3B is a cross-sectional view of a portion of an airbag assembly similar to that shown in FIG. 1 illustrating a device for controlling the degree of inflation of an airbag positioned such that an aperture in the housing is not blocked.

FIGS. 3A and 3B illustrate the operation of the pyrotechnic device 130 according to an exemplary embodiment. A signal is sent to the pyrotechnic device 130 through wires or cables 132 coupled thereto. When actuated, the pyrotechnic device 130 produces a burst or blast of gas. The burst of gas is directed at a relatively solid or rigid portion of the airbag module. This burst of gas is sufficient to cause the member 120 to deform such that it bends or moves away from the housing 110. For example, as illustrated in FIGS. 3A and 3B, an aperture or hole 121 is provided in the member 120 through which the burst of gas may be directed toward the surface of the housing 110. Upon actuation, as shown in FIG. 3B, the burst of gas causes the member 120 to bend away from the housing 110, exposing the aperture 114 formed in the housing. Accordingly, upon actuation of the pyrotechnic device 130, the aperture 114 is opened to allow gas within the airbag module to escape outside the housing 110. In this manner, the amount of gas utilized during inflation of an airbag may be modified or altered to provide an appropriate amount of cushioning for an occupant of a vehicle.

The pyrotechnic device 130 is configured such that the burst of gas produced is sufficient to overcome the force (if any) holding the second end of the member 120 adjacent the housing 110. For example, fasteners such as the fastener 140 (FIG. 2B) or 142 (FIG. 2C) are configured such that they are not so strong as to prevent the member 120 from bending away from the housing 110. It should be noted that the fasteners 122 and 123 illustrated in FIG. 1 remain in place during actuation of the pyrotechnic device 130, such that the member 120 and the pyrotechnic device 130 do not become separated from the housing 110, thereby eliminating any undesirable ejection of components of the system.

Any of a variety of electrically actuated pyrotechnic devices may be utilized. For example, according to an exemplary embodiment, the pyrotechnic device may be a standard automotive squib containing between approximately 40 and 130 milligrams of a zirconium-based or titanium-based pyrotechnic (e.g., zirconium-potassium-perchlorate, titanium-potassium-perchlorate, etc.). Other pyrotechnic materials such as nitrocellulose and the like may also be utilized in the pyrotechnic device according to other exemplary embodiments.

Figure 4:
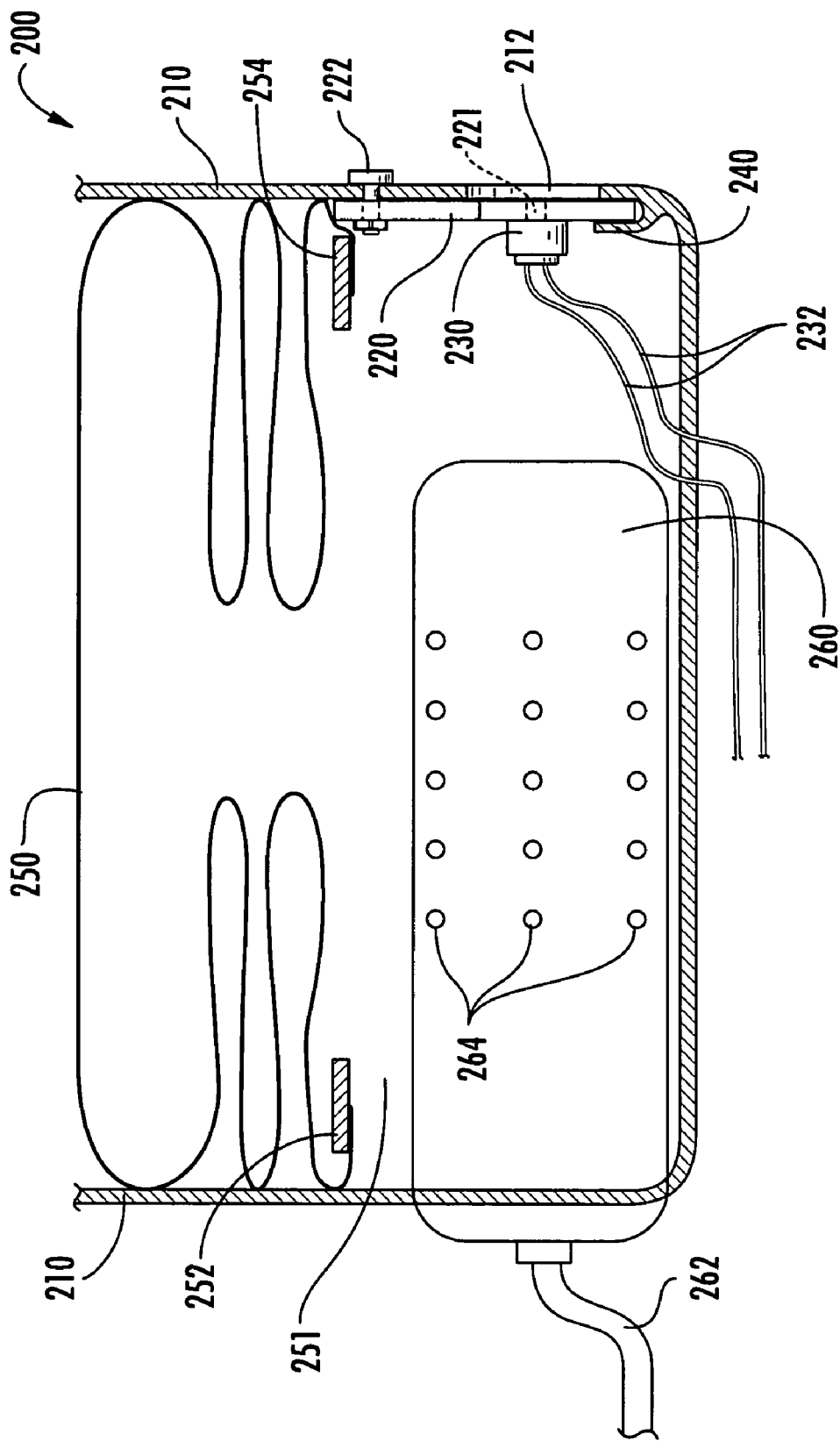
FIG. 4 is a cross-sectional view of an airbag assembly according to an exemplary embodiment in which a device for controlling the degree of inflation of an airbag is provided within an airbag container.

While FIG. 1 illustrates an embodiment in which the member 120 and the pyrotechnic device 130 are attached to an external surface of the housing 110 of the airbag module 100, according to other exemplary embodiments, the member 120 and pyrotechnic device 130 may be provided in other locations. For example, FIG. 4 illustrates an exemplary embodiment in which a member 220 similar to the member 120 and a pyrotechnic device 230 are provided adjacent an internal surface of a housing 210 of an airbag module 200. As shown in FIG. 4, an airbag 250 is attached to the module 200 at locations 252 and 254 and encloses a space 251 into which gas is introduced during inflation of the airbag 250. An inflator 260 having a plurality of holes or apertures 264 provided therein is in gas communication with the space 251 such that gas introduced into the inflator 260 from a tube or hose 262 passes through the holes 264 during inflation of the airbag 250.

Signals sent to the pyrotechnic device 230 through wires or cables 232 may be used to actuate the pyrotechnic device 230 such that a burst of gas is directed through an aperture 221 provided in the member 220 against an interior wall of the housing 210. Upon actuation of the pyrotechnic device 230, the member 220 bends away from the housing 210 such that a second end of the member (which is retained in place prior to actuation of the pyrotechnic device by a feature 240 such as a ductile strip) moves away from the housing 210. At the opposite end of the member 220, a fastener 222 such as a bolt or screw may be used to prevent the member 220 and the pyrotechnic device 230 from becoming separated from the housing 210 after actuation of the pyrotechnic device. In contrast to the exemplary embodiment illustrated in FIG. 1, the member 220 bends inward into the space 251 in the module 200, as opposed to bending outward and away from the module as illustrated in FIG. 3B.

Figure 5:
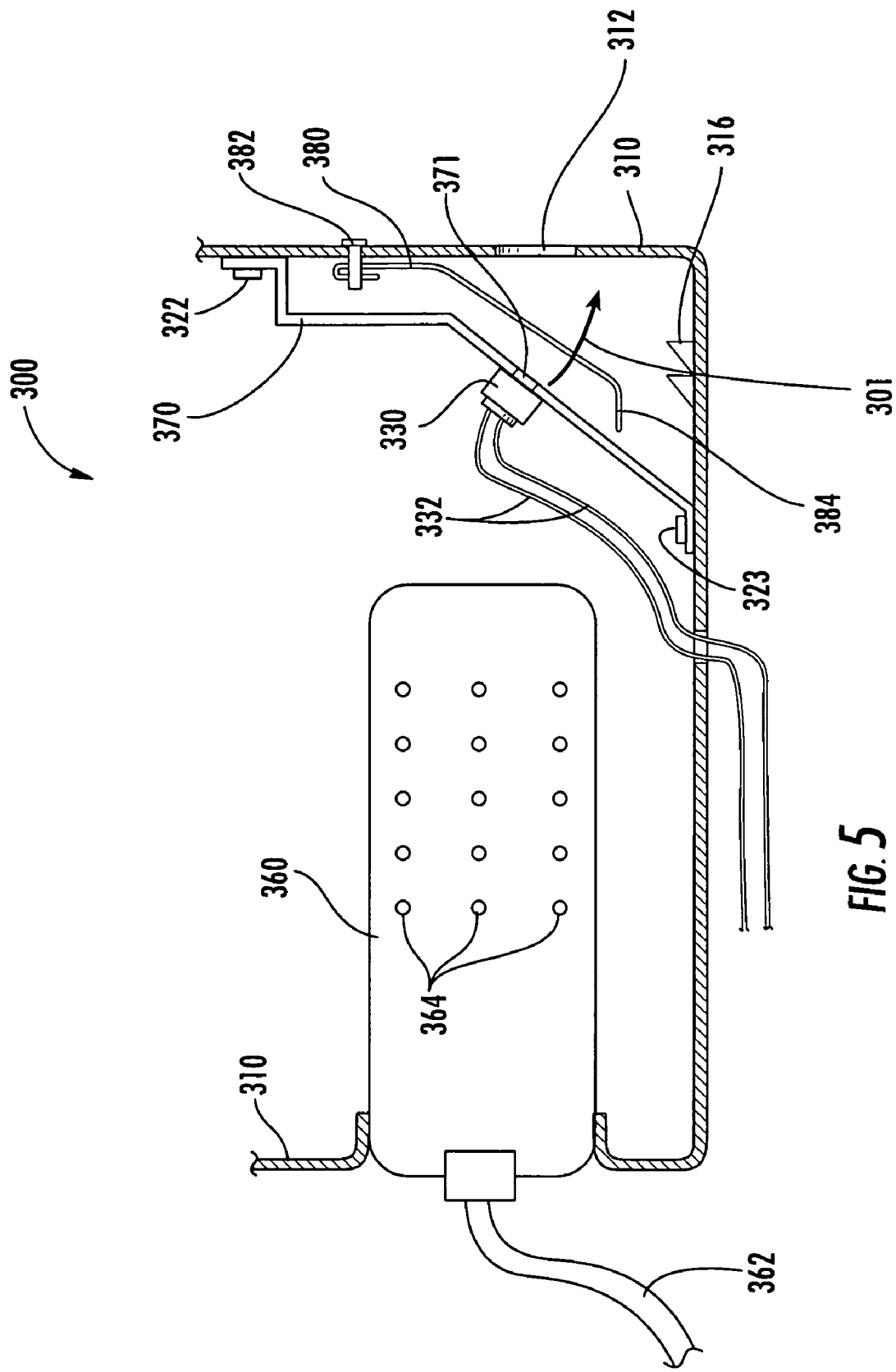
FIG. 5 is a is a cross-sectional view of an airbag assembly according to an exemplary embodiment in which a device controlling the degree of inflation of an airbag is provided within an airbag container.

Pyrotechnic devices such as those described above may also be utilized to block or seal apertures provided in the housing of an airbag module according to other exemplary embodiments (e.g., to prevent gas from escaping from the module during airbag inflation). For example, FIG. 5 illustrates a portion of an airbag module or assembly 300 in which an inflator 360 having apertures 364 for communicating gas from a tube or hose 362 is provided in a housing 310. A member or element 370 is secured or attached to the housing 310 using fasteners 322 and 323. According to an exemplary embodiment, the member 370 is a relatively rigid or fixed member made from a relatively strong material such as a metal or hard plastic. A moveable member or element 380 is secured or attached to the housing 310 using a fastener 382. The moveable member 380 is configured for movement as illustrated by an arrow 301 shown in FIG. 5. When the moveable member 380 is moved along a path illustrated by the arrow 301, an aperture 312 provided in the housing 310 is blocked or sealed such that gas from within the module 300 may not escape. A second end 384 of the moveable member 380 includes features that are configured to engage features 316 attached to the housing 310. In this manner, once the moveable member 380 is caused to move a sufficient degree, the second end 384 will latch onto the features 316 to secure the moveable member 380 in position to block the aperture 312.

As illustrated in FIG. 5, a pyrotechnic device 330 such as that shown in FIG. 1 is coupled to the member 370, which includes an aperture or hole 371 provided therein. When a signal is sent through the wires or cables 332 to the pyrotechnic device 330, a burst of gas is directed from the pyrotechnic device 330 through the aperture 371 toward the moveable member 380. The burst of gas is sufficient to cause the moveable member 380 to move along the path illustrated by the arrow 301 to cause the second end 384 of the movable member 380 to engage the features 316, thereby sealing the aperture 312.

Figure 7:
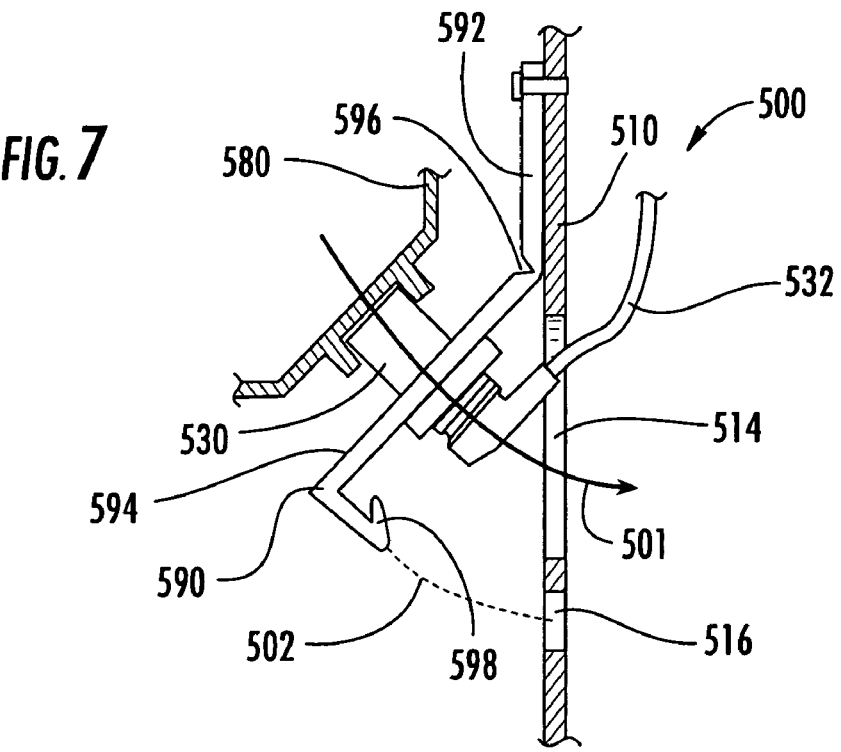
FIG. 7 is a is a cross-sectional view of an airbag assembly according to an exemplary embodiment in which a device for controlling the degree of inflation of an airbag is provided within an airbag container.

According to the exemplary embodiment illustrated in FIG. 5, the pyrotechnic device 330 is not coupled or attached to the moveable member 380, but rather to the fixed member 370. According to other exemplary embodiments, however, a pyrotechnic device may be coupled to a moveable member such that a burst of gas produced by the pyrotechnic device may be directed against a rigid or fixed member to cause the moveable member and the pyrotechnic device to move. For example, as shown in FIG. 7, a portion of an airbag module 500 is illustrated as having a housing 510 with an aperture or opening 514 provided therein. A moveable member 590 is provided with a hinge 596 (e.g., a living hinge, although hardware hinges may be used according to other exemplary embodiments). A pyrotechnic device 530 is coupled to the moveable member 590 such that a burst of air produced by the pyrotechnic device 530 may be directed against a fixed or rigid member 580 coupled to the housing 510 or another location within the module 500. Because the member 580 is relatively fixed or rigid, it will remain in place, causing the moveable portion 594 of the moveable member 590 to travel along a path illustrated by arrow 501. Upon actuation of the pyrotechnic device, therefore, the portion 594 of the moveable member 590 will move towards the housing 510 to seal the aperture 514. A feature 598 is provided in the form of an extension or hook for engaging a feature such as an aperture or hole 516 provided in the housing 510. When the portion 594 of the moveable member 590 moves to seal the aperture 514, the feature 598 travels along a path illustrated as illustrated by dashed line 502 such that it engages the aperture 516 to prevent the portion 594 of the moveable member 590 from unsealing the aperture 514.

Figure 6:
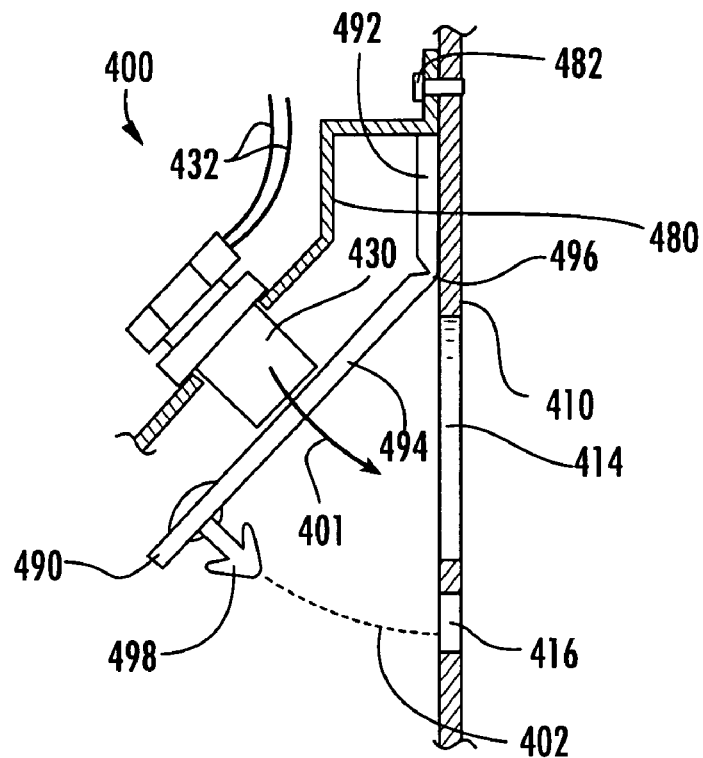
FIG. 6 is a is a cross-sectional view of an airbag assembly according to an exemplary embodiment in which a device controlling the degree of inflation of an airbag is provided within an airbag container.

FIG. 6 illustrates an airbag module or assembly 400 in which a pyrotechnic device 530 is coupled or attached to a rigid or fixed member 480 that is secured to a housing 410 of the airbag module 400 by a fastener 482. A burst of air produced by the pyrotechnic device 430 causes a portion 494 of a moveable member 490 to rotate about a hinge 496 coupling the portion 494 to a fixed portion 492 of the member 490. The portion 494 moves along the path illustrated by arrow 401 such that the portion 494 blocks an aperture 414 provided in the housing 410. A feature 498 in the form of an extension or hook is provided at a terminal end of the portion 494 of the moveable member 490 that is configured to engage a feature such as a opening or aperture 416 provided in the housing 410 to prevent the portion 494 from disengaging and unsealing the aperture 414 in the housing 410.

It should be noted that while the embodiments illustrated in FIGS. 1 and 4 illustrate a configuration in which gas is allowed to escape from an airbag module upon actuation of a pyrotechnic device, the exemplary embodiments illustrated in FIGS. 5 through 7 illustrate configurations in which actuation of a pyrotechnic device acts to seal or close an opening provided in a housing of an airbag module. Thus, with respect to the embodiments illustrated in FIGS. 1 and 4, the default inflation mechanism will be to inflate the airbag utilizing all gas introduced by an inflator unless a predetermined condition is satisfied that would require the release of a portion of the gas through an aperture or opening formed in a housing of the module. For example, in the event that a vehicle occupant is positioned within a vehicle within a predetermined distance of the airbag, it may be desirable to provide less gas to the airbag to provide greater cushioning for the occupant. With respect to the embodiments illustrated in FIGS. 5 through 7, however, the default operating condition of the airbag module will be to release a portion of the gas introduced by the inflator into the airbag module unless a predetermined condition is met that would require a greater amount of gas to be introduced into the airbag module. For example, if a vehicle occupant is positioned beyond a certain distance from the airbag, it may be desirable to provide a greater amount of gas to the airbag for proper cushioning of the occupant. In such an event, a pyrotechnic device may be actuated to seal an opening in the housing of the airbag module such that a greater amount of the gas introduced by the inflator is provided within the airbag module.

The conditions under which the pyrotechnic devices may be actuated may vary according to various exemplary embodiments. For example, it may be desirable to actuate the pyrotechnic device in a situation where a relatively low-speed vehicle collision occurs, where a rear-facing child restraint seat is present, or where a vehicle occupant is below a predetermined weight or is within a relatively close proximity of the airbag. According to an exemplary embodiment, the pyrotechnic device receives signals (e.g., through wires or cables such as wires 132 shown in FIG. 1) from an occupant sensing system or other electronic system within a vehicle.

It is important to note that the construction and arrangement of the airbag assembly as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to other exemplary embodiments. Other substitutions, modifications, changes and omissions may be made in the design, operating conditions and arrangement of the various exemplary embodiments without departing from the scope of the present inventions as expressed in the appended claims.

What is claimed is:

1. An airbag module comprising:
    a housing having at least one aperture for releasing gas from an interior of the housing during inflation of an airbag;
    a member configured for movement between a first position in which the member impedes the flow of gas through the at least one aperture and a second position in which the member does not impede the flow of gas through the at least one aperture; and
    a pyrotechnic device attached to the member for directing a burst of gas toward a fixed surface such that a force generated by the burst of gas against the fixed surface causes the member and the pyrotechnic device to move between the first position and the second position in the direction of the force,
    wherein the fixed surface is a wall of the housing.

2. The airbag module of claim 1, wherein the member is provided within the housing.

3. The airbag module of claim 1, wherein the member is provided outside the housing.

4. The airbag module of claim 1, wherein the member is attached to the housing with at least one fastener at a first end of the member, wherein actuation of the pyrotechnic device causes the member to bend away from the aperture.

5. The airbag module of claim 4, further comprising at least one fastener provided at a second end of the member opposite the first end for securing the member prior to actuation of the pyrotechnic device.

6. The airbag module of claim 1, wherein the member is provided in the first position before actuation of the pyrotechnic device.

7. The airbag module of claim 1, wherein the member includes an aperture and the pyrotechnic device is provided such that the burst of gas is directed through the aperture in the member toward the fixed surface.

8. The airbag module of claim 1, wherein the pyrotechnic device is configured to be actuated when the pressure within the housing reaches a predetermined threshold.

9. The airbag module of claim 1, wherein the pyrotechnic device includes between approximately 40 and 130 milligrams of pyrotechnic material.

10. The airbag module of claim 9, wherein the pyrotechnic material is selected from the group consisting of zirconium-based and titanium-based pyrotechnic materials.

* * * * *